UNITED STATES PATENT OFFICE.

JONATHAN MILLS, OF MILWAUKEE, WISCONSIN, ASSIGNOR OF TWO-THIRDS HIS RIGHT TO EDWARD P. ALLIS & CO., OF SAME PLACE.

IMPROVEMENT IN THE MANUFACTURE OF FLOUR.

Specification forming part of Letters Patent No. 179,214, dated June 27, 1876; application filed April 15, 1876.

*To all whom it may concern:*

Be it known that I, JONATHAN MILLS, of Milwaukee, in the county of Milwaukee and State of Wisconsin, have invented an Improved Method or Process of Treating Middlings, of which the following is a specification:

My invention consists in passing purified middlings while in a heated condition to rolls, millstones, or other disintegrating mechanism.

The object of the invention is to insure a perfect and even disintegration and granulation of the middlings, which can, I find in practice, be effected by simply heating them when in a purified condition to near the scorching-point, and passing them while at this high temperature between the rolls or stones, or to the other disintegrating or grinding apparatus commonly employed.

The heating causes an expansion and partial disintegration of the middlings, and brings them to such a condition that the disintegration is easily and thoroughly completed by the mechanism.

The operation of heating the middlings may be carried out in any suitable manner, and by any suitable apparatus; but it is preferred to pass them into a hot box or cylinder heated by steam or hot air surrounding it, or passing through tubes or flues therein.

By my process or method of treatment I am enabled to disintegrate the middlings in a far better and more satisfactory manner than by the usual method, and thus to improve both the quality and the yield of flour.

Having described my invention, what I claim is—

The herein-described method of disintegrating middlings—that is to say, by heating them and passing them while in the heated condition to stones, rolls, or equivalent disintegrating mechanism.

JONATHAN MILLS.

Witnesses:
W. H. WATSON,
WM. W. ALLIS.